United States Patent [19]

Schmitz et al.

[11] 4,173,568

[45] Nov. 6, 1979

[54] PROCESS FOR THE PREPARATION OF COPPER PHTHALOCYANINE

[75] Inventors: Reinold Schmitz, Odenthal; Klaus Wunderlich, Leverkusen, both of Fed. Rep. of Germany

[73] Assignee: Bayer Aktiengesellschaft, Leverkusen, Fed. Rep. of Germany

[21] Appl. No.: 858,825

[22] Filed: Dec. 8, 1977

[30] Foreign Application Priority Data

Dec. 16, 1976 [DE] Fed. Rep. of Germany ....... 2657139

[51] Int. Cl.² .............................................. C09B 47/04
[52] U.S. Cl. .............................. 260/314.5; 260/326 R
[58] Field of Search ...................................... 260/314.5

[56] References Cited

U.S. PATENT DOCUMENTS

| 2,964,532 | 12/1960 | Klenke, Jr. | 260/314.5 |
| 3,188,318 | 6/1965 | Mack | 260/314.5 |

FOREIGN PATENT DOCUMENTS 2432564 1/1976 Fed. Rep. of Germany ........ 260/314.5

OTHER PUBLICATIONS

Moser et al., Phthalocyanine Compounds, pp. 146 to 147 (1963).
F.I.A.T., Final Report No. 1313, vol. III, pp. 273 to 285 (1948).

*Primary Examiner*—John D. Randolph
*Attorney, Agent, or Firm*—Sprung, Felfe, Horn, Lynch & Kramer

[57] ABSTRACT

Copper phthalocyanine is obtained in high yields when phthalic acid or derivatives thereof, urea or urea derivatives, copper salts and ammonium molybdate or heated to 200°–300° C. without stirring, so slowly that the components are mixed sufficiently by heat convection during the liquid phase which occurs transitionally.

12 Claims, 1 Drawing Figure

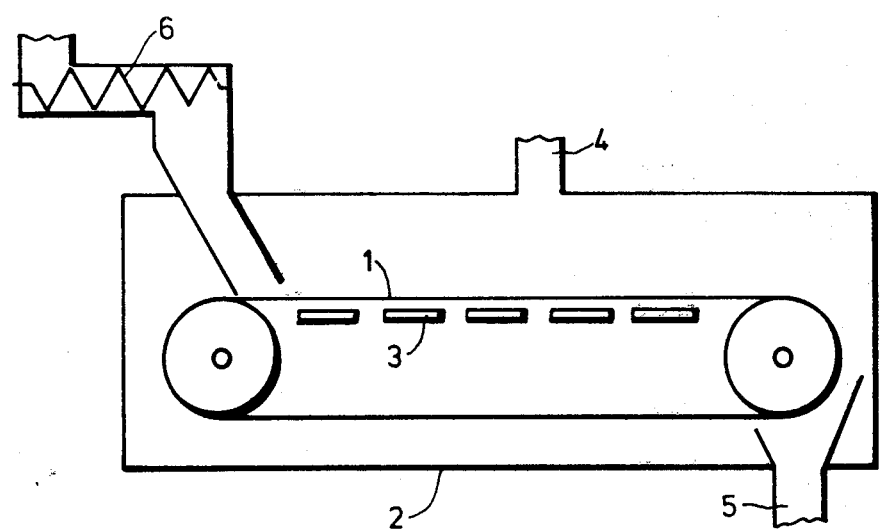

PROCESS FOR THE PREPARATION OF COPPER PHTHALOCYANINE

Copper phthalocyanine can advantageously be obtained from copper salts, phthalic anhydride and urea, preferably in the presence of a catalyst, say ammonium molybdate. Three procedures are to be distinguished.

1. The reaction is carried out in a suitable solvent in a kettle; customary solvents for this purpose are nitrobenzene or polychlorinated benzenes.

2. The reaction is carried out without a solvent in an apparatus which ensures thorough mixing of the components in each phase of the reaction; for example a cylindrical reactor through which a thin layer of the components is conveyed in a layer thickness of ¼ to ½ inch at 200° to 250° C. with the aid of a helical rotor is described in U.S. Pat. No. 2,964,532, furthermore a drum reactor in which granular copper phthalocyanine in which the reaction is complete ensures the required thorough mixing is described in U.S. Pat. No. 3,188,318, and finally a self-cleaning kneader-like reactor which has a large heating surface is described in DT-OS (German Published Specification) No. 2,432,564.

3. The components, mixed in the solid state, are heated to 200°–220° without an additional mixing device in a thin layer, for example on metal sheets.

The three procedures have various disadvantages. When solvents are used, the gases formed abundantly during the reaction ($NH_3$, $CO_2$ and $H_2O$) carry off large amounts of the solvent with them which must be separated out again from the off-gases and can endanger the environment. In addition, the necessary working-up of the solvent involves considerable expense.

The mixing apparatuses used in the second process are subjected to considerable loads caused by the behaviour of the phthalocyanine melt. This is because, after melting, the reaction mixture becomes viscous fairly rapidly (at 170°–190° C.) and finally (at 190°–210° C.) solid; it is thus susceptible to caking and under a mechanical load, such as is unavoidable in the proposed reactors and even desirable for carrying out the reaction, can lead to considerable mechanical corrosion.

Finally, although the third process avoids the faults of the first two, the yields which can be achieved with this process, particularly on a pilot-plant and industrial scale, are insufficient (Fiat Finat Report No. 1,313, Volume III, page 283, compare also U.S. Pat. No. 2,964,532, column 1, lines 26 et seq.). In addition, the charging and emptying of the reaction sheets is associated with much manual labour and is thus expensive.

The present invention relates to an improvement in the third process described above, which avoids its disadvantages. It has been found, in fact, that high yields of copper phthalocyanine are obtained when phthalic acid or derivatives thereof, urea or urea derivatives, copper salts and ammonium molybdate are heated to 200°–300° C., without stirring, so slowly that the components are mixed sufficiently by heat convection during the liquid phase which occurs transiently. This slow heating-up can either take place by providing a residence stage in the region in which the mixture becomes liquid (160°–180° C.), or a low temperature gradient with respect to time can also be provided during the entire heating, say the mechanically pre-mixed components are heated at a maximum of 2° C./minute from 30° to 270° C., preferably at 1° C./minute in the range from 100°–200° C. Since considerable amounts of gases are liberated during the reaction, the mixture tends to froth out of the kettles and the resulting solid copper phthalocyanine also virtually cannot be removed from the kettles, the reaction is appropriately carried out in a thin layer with a large surface, batchwise on metal sheets or preferably continuously on belts. The thickness of the layer is about 0.5–5 g, preferably 0.5–2 g, of reaction mixture per 1 $cm^2$ of the reaction sheet.

Copper salts which can be used are, for example, copper-I chloride, copper sulphate, basic copper sulphate and copper carbonates. A basic copper-II chloride with a copper content of about 56% and a molar ratio copper/chlorine of about 1:1 has proved particularly suitable.

Phthalic acid derivatives which can be used are, above all, phthalic anhydrides and phthalimide, but phthalamic acid, phthalic acid diamide, ammonium salts of phthalic acid and corresponding isoindolenines are also suitable.

The phthalic acid derivatives can, of course, be substituted in the aromatic nucleus, say by chlorine or bromine. 4 to 6 mols of phthalic acid derivative are employed per one mol of copper; the excess compared with the theoretical amount mainly sublimes in the form of phthalimide from the reaction mixture, and can be desublimed from the reaction gases and recycled to the process again.

Instead of urea, urea derivatives, such as biuret, guanidine and cyanuric acid, can also be employed.

Ammonium molybdate is preferably used as the catalyst in an amount of 0.001 to 0.5% by weight, relative to the amount of phthalic acid derivative employed, preferably 0.02 to 0.2% by weight. However, other molybdenum compounds can also be employed, as well as other catalysts described in the literature.

Since copper phthalocyanine is pyrophoric at a high temperature, the reaction is carried out under an inert gas atmosphere, preferably under nitrogen.

In addition to the simple procedure, a particular advantage of the process is the fact that the resulting phthalocyanines are obtained in relatively high purity (70–90%). They can be purified, without previous extractive boiling to 98% pure material from a little concentrated sulphuric acid by diluting to 82% strength acid, but a 95% pure phthalocyanine is obtained even by simple extractive boiling with acid.

EXAMPLE 1

A round VA vessel (9 cm $\phi$) with a flat bottom, containing a mixture of 21 g of phthalic anhydride, 2.7 g of CuOHCl ($\triangleq$ 1.53 g of Cu), 24 g of urea and 20 mg of ammonium molybdate, is heated to 270° C. in an annealing oven in the course of 2 hours with a uniform rise in temperature of 2° C./minute and is then heated at 270° C. for a further 2 hours, During heating and cooling, a nitrogen atmosphere is maintained above the reaction by passing a moderate stream of nitrogen over. 15.6 g of a porous copper phthalocyanine are obtained which, according to analysis, is 81.7% pure (91.7% of theory, relative to the copper employed). Sublimates of phthalimide form at cooler points of the oven.

If the procedure followed is as above, but the mixture is heated to 270° C. in the course of ¼ hour and after-heated for 2 hours at 270° C., a yield of copper phthalocyanine of only 80% of theory is obtained.

EXAMPLE 2

A shallow enamel dish with a flat bottom (length 28 cm, width 18 cm and height 4 cm) is charged with a mixture of 108 g of phthalic anhydride, 144 g of urea, 16.1 g of CuOHCl (56.7% of Cu according to analysis) and 0.1 g of ammonium molybdate and, is heated in a circulating air drying cabinet to 270° C. in the course of 2 hours whilst passing nitrogen through and is then kept at this temperature for 2 hours. After cooling, the copper phthalocyanine can be very easily removed from the sheet as a porous slab; it weighs 94.8 g and, according to analysis, is 78.6% pure. 75.8 g of 98% pure copper phthalocyanine can be obtained from 10 parts of concentrated sulphuric acid by diluting to 82% strength acid.

EXAMPLE 3

A round VA vessel (9 cm $\phi$) with a flat bottom, containing a mixture of 28 g of phthalic anhydride, 14 g of phthalic acic imide, 60 g of urea, 5.4 g of copper oxychloride ($\Delta$ 3.06 g of Cu) and 20 mg of ammonium molybdate, are heated, in an annealing oven whilst passing nitrogen through, from 20° to 170° C. in the course of 30 minutes, then at 170° C. for 1 hour, then from 170° to 270° C. in the course of a quarter of an hour and then at 270° C. for 1 hour. After cooling, 42 g of 60.8% pure copper phthalocyanine (91.3%, relative to the copper employed) are obtained.

EXAMPLE 4

A round VA vessel (9 cm $\phi$) with a flat bottom, containing a mixture of 28 g of phthalic anhydride, 14 g of phthalic acid imide, 48 g of urea, 5.4 g of copper oxychloride ($\Delta$ 3.06 g of Cu) and 20 mg of ammonium molybdate, is heated, in an annealing oven under a nitrogen atmosphere, to 270° C. in the course of 2 hours with a uniform rise in temperature of 2° C./minute and is then heated at 270° C. for a further hour. After cooling, 37.8 g of 68.9% pure copper phthalocyanine (93.9% of theory) are obtained.

EXAMPLE 5

(Diagrammatic drawing: FIG. 1)

30 g/minute of a mixture of 28 kg of phthalic anhydride, 14 kg of phthalic acid imide, 48 g of urea, 5.4 kg of copper oxychloride ($\Delta$ 3.06 kg of copper) and 20 g of ammonium molybdate are placed on a continuous VA belt (width 20 cm and total length 2 m, that is to say effective length about 1 m) which is in a heated tube sealed on both sides and which moves over a series of electrical heating elements at a speed of 2 cm/minute. The heating of the belt is adjusted so that about 160° C. is measured at the start and about 220° C. is measured at the end and so that the rise in temperature is uniform over the length of the belt. The reaction tube is rendered inert by means of nitrogen. At the end of the belt, 13 g of 60% pure copper phthalocyanine are removed per minute, corresponding to 89.4% of theory. The reaction gases are fed to a waste air installation with a desublimator, where the phthalimide, which sublimes, is precipitated.

1 Continuous belt
2 Heated mantle
3 Electrical heating elements
4 Outlet to waste air installation with desublimator
5 Removal of the product (gas barrier via cellular wheel sluice)
6 Product feed via metering screw

We claim:

1. In the process for preparing copper phthalocyanine by reacting phthalic acid, phthalic anhydride, phthalimide, phthalic acid diamide, ammonium salt of phthalic acid or the corresponding isoindolenines; with urea, biuret, guanidine or cyanuric acid; and with copper salts in the solid state; the improvement comprising heating the components from 30° to 270° C. in a thin layer so that an average rise in temperature of 2° C./minute is not exceeded.

2. Process according to claim 1, in which the thin layer comprises 0.3–5 g of reaction mixture per cm$^2$.

3. Process according to claim 1, in which that the thin layer comprises 0.5–2 g per cm$^2$.

4. Process according to claim 1, in which that the temperature average temperature rise in the range from 100°–200° C. does not exceed 1° C./minute.

5. The process of claim 1 in which a catalyst is used.

6. The process of claim 1 in which the reaction is ended by further heating at 220° C. to 300° C.

7. The process of claim 1 in which the copper salt is copper I chloride, copper sulphate, basic copper sulphate or copper carbonate.

8. The process of claim 1 which is conducted continuously.

9. The process of claim 5 in which said catalyst is a molybdenum compound.

10. The process of claim 5 in which said catalyst is ammonium molybdate.

11. The process of claim 1 in which phthalic anhydride, phthalic acid imide, urea and copper oxychloride are reacted in the presence of ammonium molybdate catalyst.

12. The process of claim 1 in which the yield of copper phthalocyanine is greater than obtained with more rapid heating.

* * * * *